(No Model.) 2 Sheets—Sheet 1.

C. SEYMOUR.
MACHINE FOR BORING HUBS.

No. 467,206. Patented Jan. 19, 1892.

Witnesses:
G. F. Downing
V. E. Hodges

Inventor,
Charles Seymour
By his Attorneys
Leggett and Leggett (No Model.) 2 Sheets—Sheet 2.
C. SEYMOUR.
MACHINE FOR BORING HUBS.
No. 467,206. Patented Jan. 19, 1892.
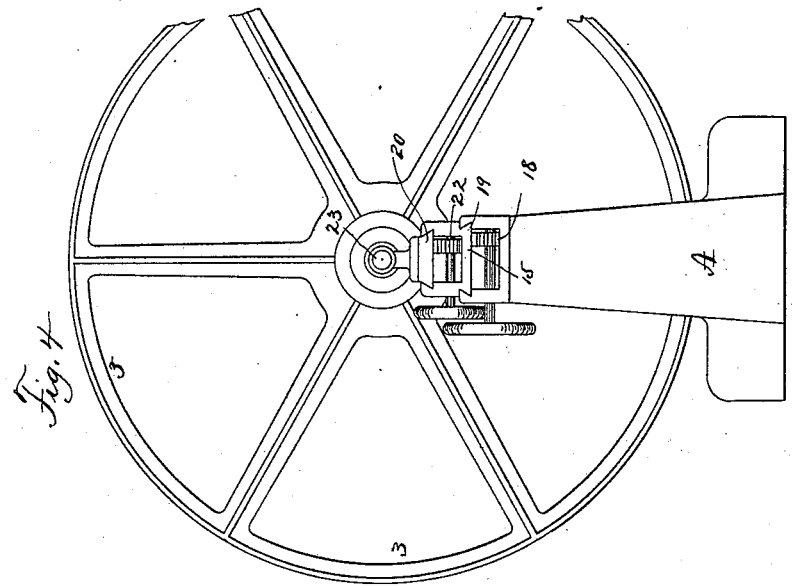
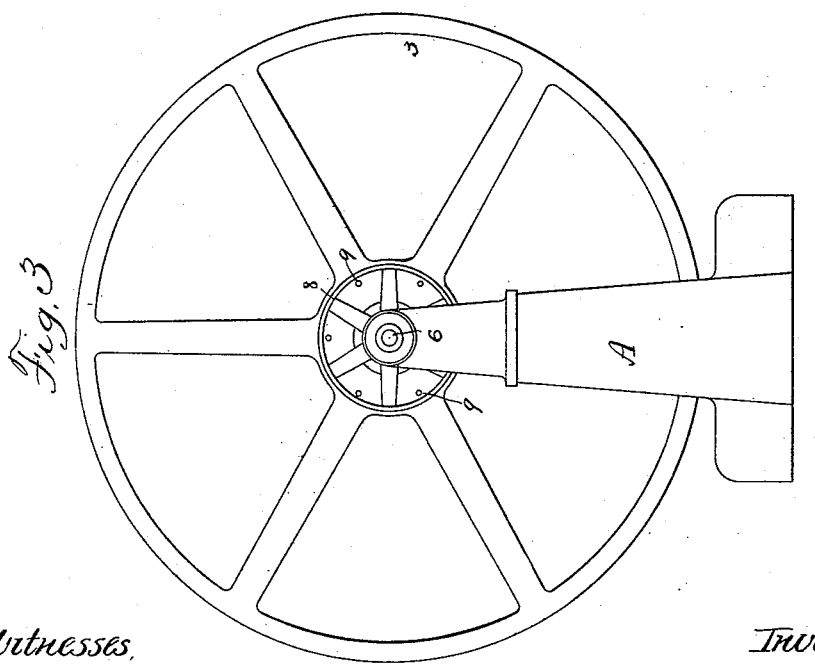
Witnesses,
G. F. Downing.
V. E. Hodges.
Inventor
Charles Seymour
By his Attorneys
Leggett & Leggett

UNITED STATES PATENT OFFICE.

CHARLES SEYMOUR, OF DEFIANCE, OHIO, ASSIGNOR TO THE DEFIANCE MACHINE WORKS, OF SAME PLACE.

MACHINE FOR BORING HUBS.

SPECIFICATION forming part of Letters Patent No. 467,206, dated January 19, 1892.

Application filed March 10, 1891. Serial No. 384,445. (No model.)

*To all whom it may concern:*

Be it known that I, CHARLES SEYMOUR, of Defiance, in the county of Defiance and State of Ohio, have invented certain new and useful Improvements in Machines for Boring Hubs; and I do hereby declare the following to be a full, clear, and exact description of the invention, such as will enable others skilled in the art to which it pertains to make and use the same.

My invention relates to an improvement in machines for manufacturing vehicle-wheels, and more especially to the class known as "hub-boring" machines, the object being to provide novel mechanism for clamping and operating upon a vehicle-wheel, thereby lessening the labor and time required in the manipulation of the article.

With this end in view my invention consists in certain novel features of construction and combinations of parts, as will be hereinafter described, and pointed out in the claims.

Figure 1:
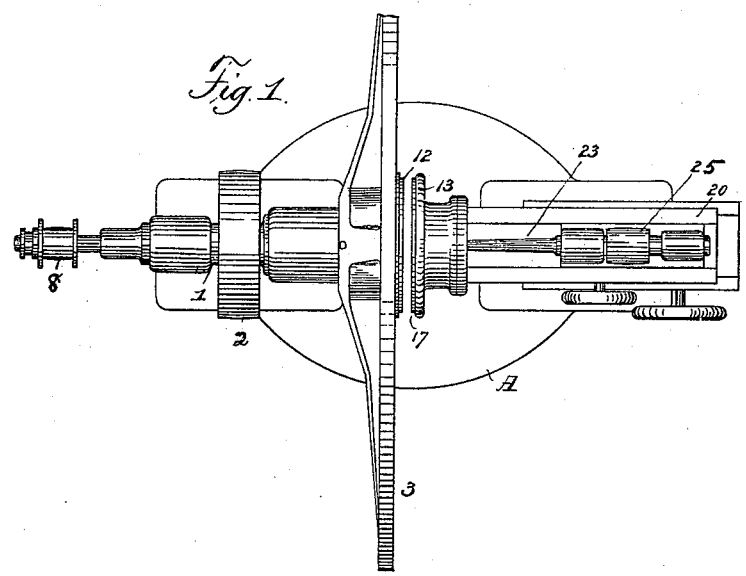
Figure 2:
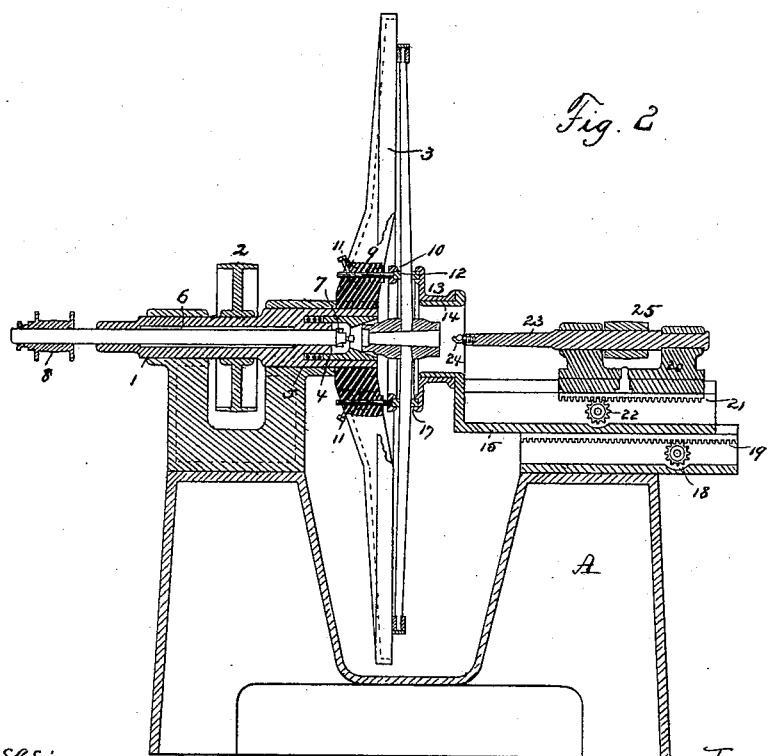

In the accompanying drawings, Figure 1 is a plan view. Fig. 2 is a longitudinal sectional elevation. Fig. 3 is a view of the head end, and Fig. 4 is a view of the rear end, of a machine for boring the hub of a wheel to the proper shape and size to receive the axle-box.

A represents the trunk-frame of the machine, upon which the parts of the machine are supported. The frame is hollowed out through the center, and on the main portions are stationed the working parts. A shaft 1 is revolubly supported in suitable journals and provided with a pulley 2, whereby it is driven. On the inner end of this shaft the usual face-plate 3 is secured, the latter comprising spokes and rims and being designed to support the wheel in its rotation and maintain it in a true plane. The shaft 1 is bored out at its inner end and fitted to its bore in the cylindrical sleeve 4. This sleeve has a conical interior formation at its inner end adapted to receive the point of the wheel-hub for the purpose of centering it, and to retain this sleeve yieldingly in place and maintain it in contact with the end of the hub a spiral spring 5 is placed back of its inner end.

Journaled inside of the shaft 1 is the cupping-spindle 6, and on the inner end of the latter a cutter 7 is mortised, this cutter being constructed to trim out the small end of the hub. Belt-pulley 8 is mounted on the outer end of this spindle and through it motion is imparted to the spindle. The pulley has a spool-shaped outer end, and a shipping-lever (not shown) is calculated to co-operate in the usual way for reciprocating the spindle.

The face-plate 3 is of usual form so far as its general construction is concerned; but near its hub are a series of stems 9 9, capable of sliding freely in and out, and on their inner ends is secured the clamping-ring 10. The ring may be thrown in and out to suit the different dish of the spokes by means of set-screws 11 11 on the outer ends of the stems, they being swiveled in the face-plate, it being understood that the rim of the wheel always rests against the face-plate. The clamping-ring 10 is provided with an annular groove, in which is placed a pad 12. This pad is made of leather, rubber, or other soft material, so as not to mar the spokes when in contact with them. A corresponding clamping-ring 13 to the one described is revolubly supported on the cylindrical bearing 14. This bearing is a part of the sub-carriage 15. The clamping-ring 13 is provided with a soft pad 17, corresponding to pad 12. The edges of the sub-carriage are mounted in grooves in the side of the frame, wherein they are capable of sliding back and forth. The required movement is given to the sub-carriage by turning the pinion 18, which meshes with rack 19. The inner clamping-ring is first shifted to suit the dish of the wheel, and then the hub-carriage is shifted to move the other clamping-ring 13 against the wheel at a point opposite the clamping-ring 10. It will be seen that the clamping-rings engage the spokes near the hubs, where the work is being done.

A carriage 20 is mounted to reciprocate in the sub-carriage and is controlled by a rack and pinion 21 and 22, respectively, as in the case of the sub-carriage. Journaled in this carriage is the boring-spindle 23. This has a cutter 24 on its inner end, by which the hub is bored. This spindle is provided with a pulley 25, by which it is driven at a high speed. The cutter and spindle are shifted by simply shifting the carriage when it is desired to enter or to be removed from the hub.

It is evident that slight changes might be resorted to in the form and arrangements of the several parts described without departing from the spirit and scope of my invention, and hence I do not wish to limit myself to the exact construction herein set forth; but, Having fully described my invention, what I claim as new, and desire to secure by Letters Patent, is—

1. The combination, with a frame and rotary face-plate, of a clamping-ring connected with the latter and capable of being shifted to suit the dish of the wheel being operated upon, a second clamping-ring independent of the other and adapted to embrace the spokes opposite the former clamping-ring, and cutters operating independently of the clamping-rings, substantially as set forth.

2. The combination, with a rotary shaft having a face-plate thereon, of a spring-cushioned cylindrical sleeve fitted to the bore of the shaft, said sleeve having a conical interior adapted to center a hub inserted therein, substantially as set forth.

3. The combination, with a rotary shaft bored out at one end and a face-plate secured to the shaft, of a cylindrical sleeve fitted in the bore of the shaft, this sleeve having a conical interior and provided with a spring at its inner end to force it normally and yieldingly outward, substantially as set forth.

4. The combination, with a frame, a shaft revolubly supported thereon, a face-plate secured on the shaft, a cylindrical sleeve fitted in the inner end of the shaft, and co-operating clamping-rings, of a movable sub-carriage carrying one of the clamping-rings, a movable carriage mounted on the sub-carriage, and a tool mounted on the movable carriage, substantially as set forth.

In testimony whereof I have signed this specification in the presence of two subscribing witnesses.

CHARLES SEYMOUR.

Witnesses:
   GEO. W. DEATRICK,
   W. O. DEATRICK.